United States Patent [19]

Muroya

[11] Patent Number: 5,040,222

[45] Date of Patent: Aug. 13, 1991

[54] PATTERN GENERATION METHOD FOR REGISTERING HANDWRITING

[75] Inventor: Masami Muroya, Tokyo, Japan

[73] Assignee: Cadix Inc., Tokyo, Japan

[21] Appl. No.: 450,551

[22] Filed: Dec. 14, 1989

[30] Foreign Application Priority Data

Apr. 3, 1989 [JP] Japan .................................. 1-84280

[51] Int. Cl.$^5$ .............................................. G06K 9/00
[52] U.S. Cl. ......................................... 382/3; 382/13
[58] Field of Search ................... 382/3, 13, 24, 34, 52, 382/30, 14

[56] References Cited

U.S. PATENT DOCUMENTS 4,646,351 2/1987 Asbo et al. ............................... 382/3
4,718,102 1/1988 Crane et al. ............................ 382/24

OTHER PUBLICATIONS

Plamondon et al. "Automatic Signature Verification and Writer Identification—The State of the Art" *Pattern Recognition*, vol. 22; No. 2 pp. 107-131; 1989.

*Primary Examiner*—David K. Moore
*Assistant Examiner*—Yon Jung
*Attorney, Agent, or Firm*—Koda and Androlia

[57] ABSTRACT

A pattern generation method for registering handwriting and a method for updating same that facilitates the obtaining of a registration pattern that reflects accurately the characteristics of an individual handwritten signature. Dynamic programming matching is used to obtain a cumulative error among a plurality of input patterns in the form of a distortion function, and this distortion function is used for shape averaging and time distortion averaging of input patterns.

2 Claims, 7 Drawing Sheets

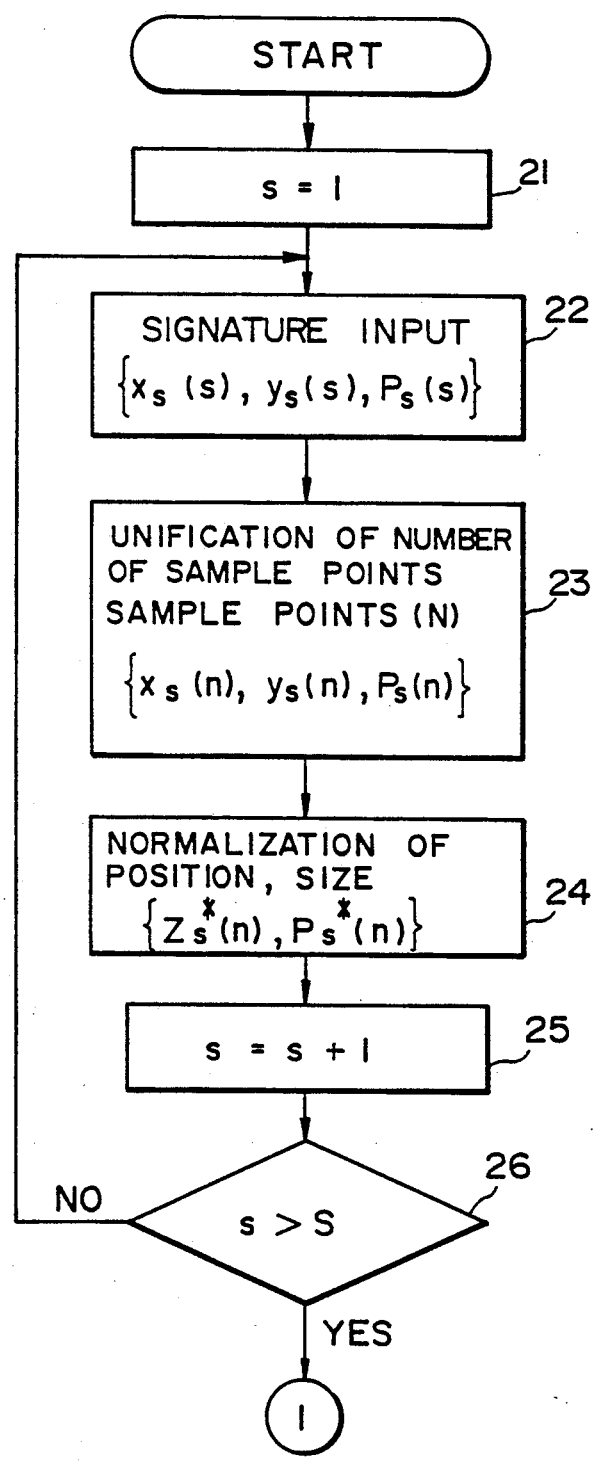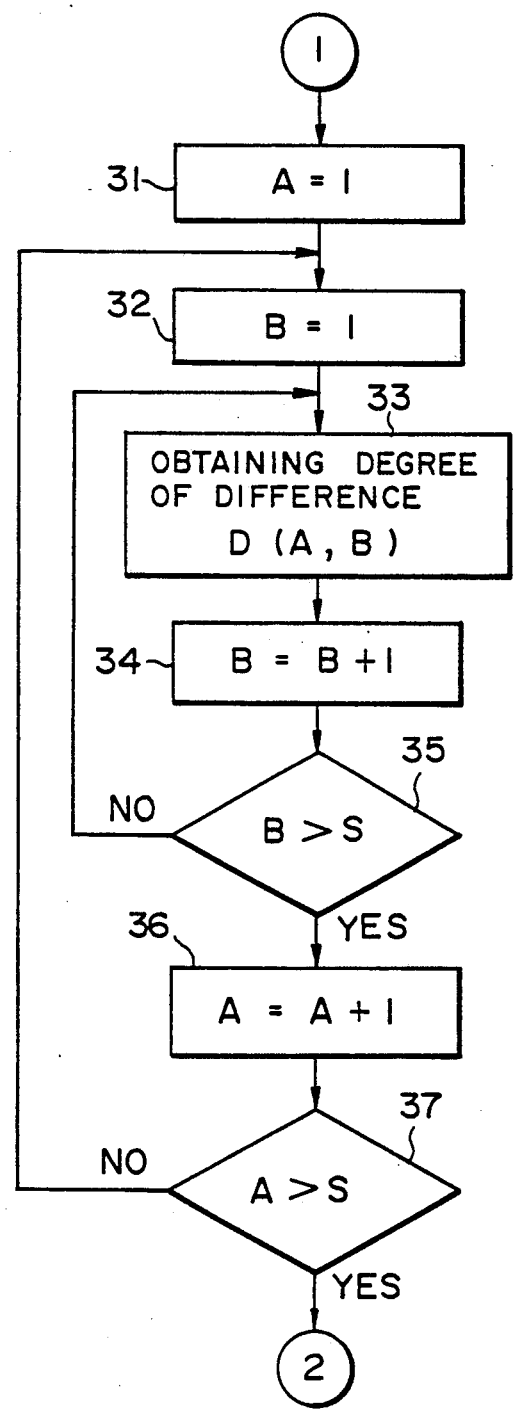

PATTERN GENERATION METHOD FOR REGISTERING HANDWRITING

BACKGROUND OF THE INVENTION

1. Field of the Invention

The present invention relates to a pattern generation method for registering handwritten characters or signatures in a pattern recognition system, and a method for updating them in which dynamic programming matching is used to perform pattern learning based on plural inputs of handwritten characters or signature patterns and the pattern thus learned is generated for registering a pattern which possesses the distinguishing features of the writer.

2. Description of the Prior Art

In recent years, there has been a broad-based demand from various sectors of industry for a system that will allow the online recognition of handwritten characters written with no restrictions on the writer's desired style or speed. Handwritten character recognition is attracting attention as a convenient way of inputting handwritten kanji characters into computer systems such as word processors. Ordinary word processors rely on keyboard input, but because this requires special training, it is not always convenient for the ordinary user. Therefore, handwritten character recognition is useful when frequent use is made of word processors, such as for processing of chits and the like. A signature is another good example of cursive handwriting. Signatures are widely used as a way of confirming the identity of individuals, and signature verification has therefore assumed a critical importance for detecting forged signatures. It is therefore necessary to be able to discriminate accurately between genuine and false signatures. Previously this could only be done by a visual examination, but it is now possible to use electronic means to verify the authenticity of a signature by a technique in which the signature is recognized as a pattern of electrical signals and compared with a registered pattern that has been stored in the system beforehand. Verification based on such pattern recognition can provide a considerable improvement in the accuracy with which a signature can be used to confirm the identity of the signer, and is of considerable utility for expanding the range of applications thereof.

Signature verification was disclosed as part of the online method of handwritten character identification described in Japanese Laid-open Patent Application 62-287387. In the method disclosed, dynamic programming matching is used to obtain a distortion function between a registration pattern and an input signature pattern; the use of a registration pattern and an input signature pattern writing pressure information as well as coordinate information also was disclosed by the prior art. As such, this prior art could provide highly accurate signature verification.

Thus, the prior art incorporating writing pressure information as well as coordinate information in the form of time series information and dynamic programming matching for time normalization to obtain the degree of difference also produced quite a high recognition rate. However, a problem was that unless the registration pattern used as the reference standard for signature verification was correctly prepared, the recognition rate decreased.

One way of preventing deterioration in the recognition rate caused by individual variation has been to register a plurality of character patterns or signature patterns and then, during the recognition process, to obtain the degree of difference between an input pattern and the registration patterns, and then take the degree of difference with the registration pattern closest to the input pattern as the degree of difference to that registration pattern. The problem with this method has been that the degree of difference has to be calculated with respect to many patterns, lengthening the recognition time.

Preparing an average pattern that absorbs the variations in a plurality of input patterns would allow a single pattern to be used as the registration pattern. However, with such a method based on a simple average, during the recognition processing there is again the problem of pattern distortion along the time axis leading to a degradation of the writing and writing pressure, making it unsuitable as a registration pattern.

In signature verification, fluctuations in such a registration pattern become a problem when preparing an initial registration pattern that takes individual idiosyncrasies into account, and each time the registration pattern has to be updated because of gradual changes in the signature.

The object of the present invention is to provide a pattern generation method for registering handwriting and a method for updating same that facilitates the obtaining of a registration pattern that accurately reflects the characteristics of an individual handwritten signature.

To achieve this, the present invention comprises the use of dynamic programming matching to obtain a cumulative error among a plurality of input patterns in the form of a distortion function, and using this distortion function to perform shape averaging and time distortion averaging of input patterns. For this, a registration pattern is prepared by the steps of:

multiple inputs of the same handwritten characters in the form of three-dimensional time series information relating to coordinates and writing pressure;

normalization of the position and size of the multiple handwritten character input patterns;

calculation of distortion function for selecting a desired pattern from the multiple input patterns as a reference pattern and obtaining the time distortion function between the reference pattern and another input pattern using dynamic programming matching;

time axis correction for correcting the time axis of each input pattern by means of the distortion function;

averaging the time axis corrected multiple input patterns;

distortion averaging for averaging the multiple distortion functions; and time distortion correction for correcting the time axis of the shape averaged patterns, using the distortion function average.

The present invention also comprises using the above steps for updating registration patterns. With respect to handwritten character input patterns that change over time, this enables registration patterns to be updated in accordance with gradual changes in input patterns. In this case the multiple input patterns are dealt with as existing registration patterns and as the most recent input patterns, and the patterns are thereby brought up to date in accordance with gradually changing input patterns.

Thus, in accordance with the present invention a plurality of input patterns are normalized, time axis corrected using distortion functions and shape averaged, whereby the input pattern shape (coordinate and writing pressure information) is averaged.

However, if only the shape is averaged the distortion function will cause the time axis to be corrected to the reference pattern time axis, so that the reference pattern will have a major influence on the time series information. However, it is desirable that the registration pattern be one that fully reflects the individual characteristics, with reference also to time series information. To solve this problem, in the present invention the distortion functions themselves are averaged to perform time distortion correction with respect to the time axis of the obtained shape averaged pattern, thereby removing the distortion at the time of the normalization, with the result that pattern variation is corrected for.

Therefore, it thus becomes possible to obtain a virtual registration pattern which contains the signature characteristics in which movement and shape are both corrected for by shape averaging and time averaging, providing a clear, sharp registration pattern, which has not been possible with the conventional simple pattern averaging. Also, in preparing the handwritten character recognition registration pattern, it is possible to prepare and register an optimum pattern with the same method, with the time axis as an arc axis.

In accordance with the present invention the registration pattern can be used to update existing registration patterns and combined with gradually changing input patterns to obtain the latest pattern for use as the registration pattern.

Further features of the invention, its nature and various advantages will be more apparent from the accompanying drawings and the following detailed description of the invention.

BRIEF DESCRIPTION OF THE DRAWINGS

FIG. 2 shows the steps of signature input and preliminary normalization of the invention;

FIG. 3 shows the steps for obtaining the differences among input patterns;

DETAILED DESCRIPTION OF THE PREFERRED EMBODIMENTS

Figure 1:
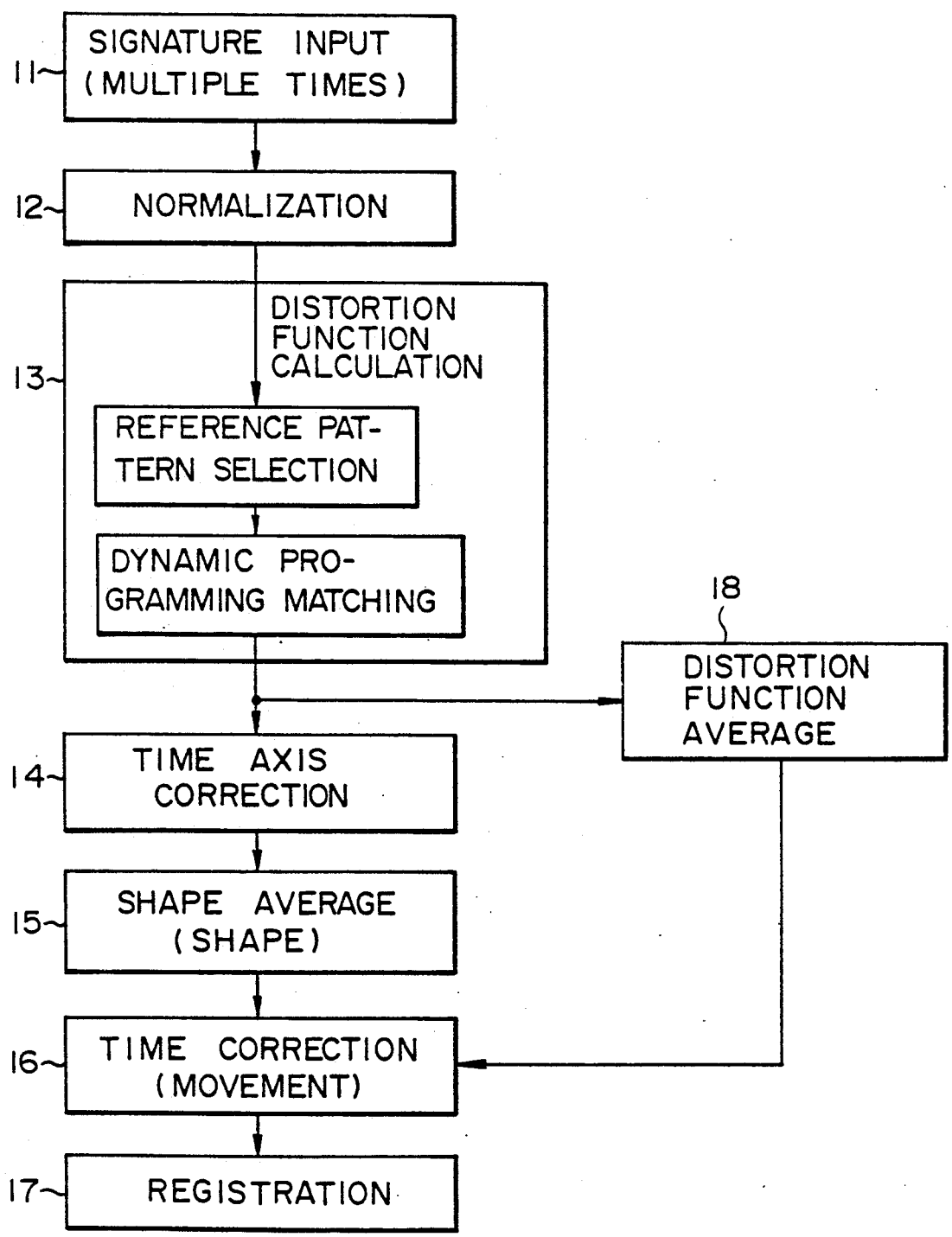
FIG. 1 is a schematic view showing the method of preparing a registration pattern in accordance with the present invention.

FIG. 1 is a schematic illustration of the various steps in accordance with the present invention.

The size and position of multiple inputs of a signature input in step 11 are normalized in step 12 prior to the correction process. In step 13 an input pattern is selected as a reference pattern and the distortion function of another input pattern or all input patterns relative to the reference pattern are calculated.

In step 14 the distortion function is used for time axis correction of each pattern, and in step 18 the average of the distortion functions themselves is obtained. In step 15 the plurality of input patterns that have been time axis corrected are shape averaged, and this is followed in step 16 by time distortion averaging by means of the distortion functions to thereby average the movements.

By using dynamic programming matching, a registration pattern is obtained in step 17 that accurately represents the characteristics of the individual signature with respect to movement and shape. Details of each of these steps will now be described.

Signature input: First, in accordance with the present invention a signature is read in a number of times in the form of coordinate and writing pressure three-dimensional time series information. Signature input and normalization are illustrated in FIG. 2.

In this invention, this information is read in, in step 22, on an online basis, in the form of electrical signals. The position of initial contact between the pen and the paper is taken as the starting point from which pen x and y coordinates and writing pressure p are measured.

In practice a signature pattern is represented as time series data $\{x_s(m_s), y_s(m_s), p_s(m_s)\}$ sampled at equal intervals of time, that include coordinate and writing pressure information. Here, $m_s$ is a number of sample points from 1 to $M_s$ and s is a signature number from 1 to S.

Normalization: The signature inputs are then subjected to the following data normalization, which in this embodiment includes making the number of sample points the same and normalizing of position and size. In step 23 in the figure, the number of sample points is given the same value N for all input patterns, and interpolation is used to convert the time series data to the data series $\{x_s'(n), y_s'(n), p_s'(n)\}$ in which the time from the starting point to the end point is the same.

In step 24, with respect to information relating to three-dimensional time series along the time axis, the position and size of the input patterns are normalized. With respect to coordinate data, x and y are shown as complex coordinate series, producing $$z_s'(n) = x_s'(n) + iy_s'(n) \quad n = 1, 2, \ldots, N. \tag{1}$$

where $i = \sqrt{-1}$. Here, a new complex coordinate series $$z_s^*(n) = (z_s'(n) - Z_{sg})/(\|z_s'(n) - Z_{sg}\|). \tag{2}$$

is determined. Here, $Z_{sg}$ is the centroid of the input pattern, defined as $$Z_{sg} = (1/L)\Sigma_{l=1}^{L} z_s(n).$$

Also, the symbol $\|\cdot\|$ represents the complex coordinate series norm, and is $$\|z_s(n)\|^2 = (1/L)\Sigma_{n=1}^{N} |z_s(n)|^2$$

The complex series $z_s^*(n)$ obtained by this procedure is termed normalized complex coordination series, and will be referred to herein simply as coordinate series. Similarly, with respect to writing pressure information, the size is normalized as follows.

$$p_s^*(n) = (p_s'(n))/(\|p_s'(n)\|). \tag{3}$$

Here, p*(n) is termed a normalized writing pressure series, and will herein be referred to as writing pressure series. This coordinate and writing pressure normalization is performed for each signature input; as shown in FIG. 2, normalization is performed the same number of times as there are signatures (S) (steps 21, 25 and 26).

Reference pattern selection: The input pattern with the smallest cumulative degree of difference is selected as the reference pattern. Dynamic programming matching is used to find the degree of difference among the input patterns. In performing the dynamic programming matching, the coordinate series and writing pressure series are coordinated simultaneously, using a prescribed weighting, in step 33 (FIG. 3).

Figure 4A:
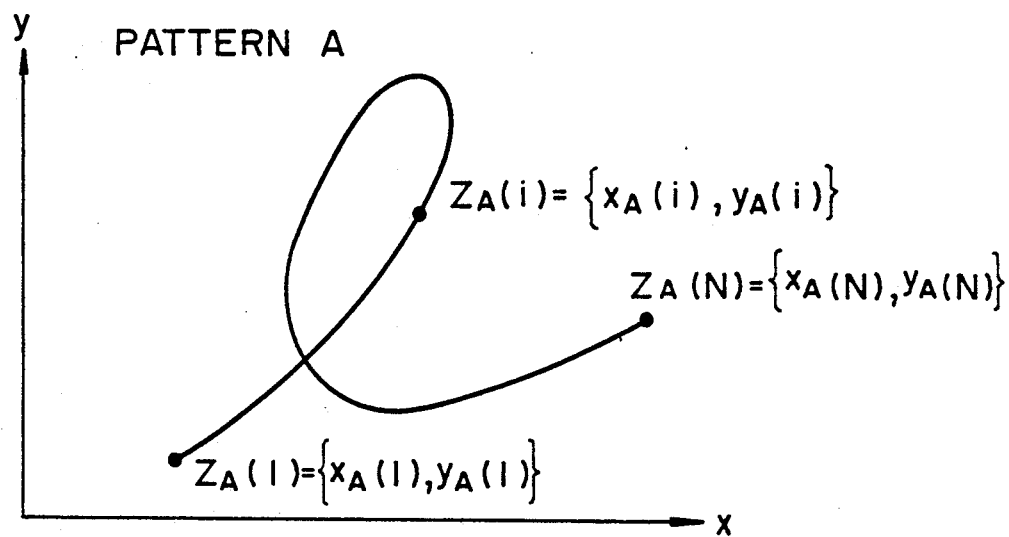
FIGS. 4A and 4B are explanatory diagrams showing the coordinate information of two input patterns.
Figure 4B:
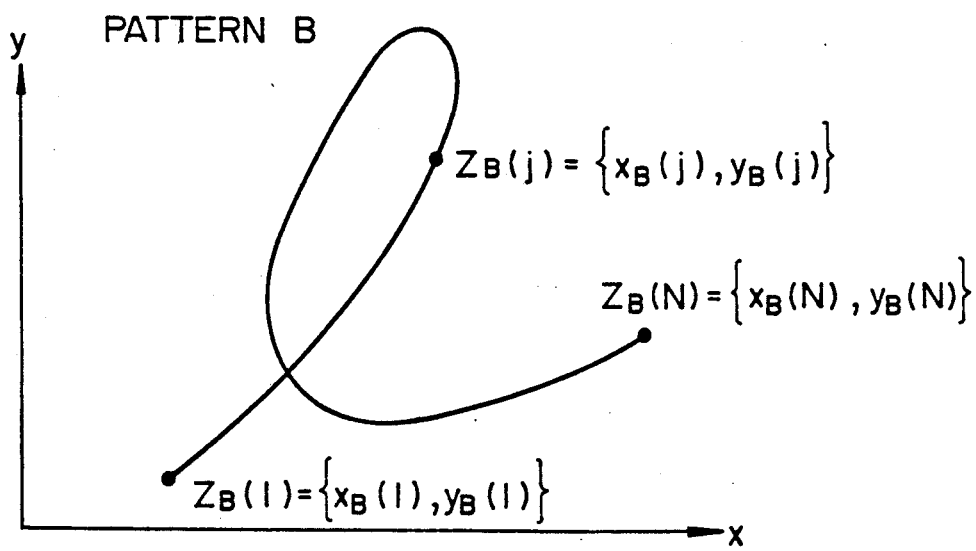

FIGS. 4A and 4B show the respective coordinate patterns of input patterns A and B, with the horizontal axis representing the real part and the vertical axis the imaginary part. Preliminary normalization is used to make the starting point the same in both cases, i.e., $z(1) = \{x(1), y(1)\}$. To simplify the description, the same value is used for the end point of the strokes, i.e. $z(N) = \{x(N), y(N)\}$. Thus, in accordance with this simplified example it can be seen that all that has to be done is to perform normalization to minimize the cumulative error arising during the writing from differences in length between the starting points $z(1)$ and $z(N)$ derived by dynamic programming matching. This normalization is performed by applying the specified distortion function to patterns A and B, the distortion function being applied as a method of optimizing the dynamic programming matching based multi-stage determination process.

Also, as mentioned, dynamic programming matching in accordance with this embodiment is characterized by simultaneously processing the coordinate series and writing pressure series by assigning an appropriate weighting to each.

In FIG. 4, the difference d between the ith point of pattern A and the jth point of pattern B is shown as follows, using the coordinate series and writing pressure series obtained by the preliminary normalization.

$$d^2(i, j) = (1 - W_p) |z^*_A(i) - z^*_B(j)|^2 + W_p |p^*_A(i) - p^*_B(j)|^2 \quad (4)$$

$$i, j = 1, \ldots, N.$$

Here, $w_p (0 \leq w_p \leq 1)$ is the weighting with respect to the writing pressure series and $(1 - w_p)$ is the weighting with respect to the coordinate series.

Thus, when writing pressure weighting $w_p = 0$, function d is inactive with respect to the writing pressure series, and depends only on the pen coordinates, which is equivalent to treating the character pattern as a single stroke. When $w_p = 1$, function d depends only on writing pressure, and as such means that the shape of the character will be ignored in the recognition process.

Therefore, in accordance with this embodiment it becomes possible to apply dynamic programming matching by setting a specific value for the weighting coefficient whereby a common method of calculation can be employed for both the coordinate series and the writing pressure series.

In consideration of the non-linear conversion between the axes of patterns A and B, based on the dynamic programming matching concept the error thereof is defined as follows.

$$D^2(A, B) = (1/2L) \min_{i,j} \sum_{l=1}^{L} d^2\{i(l), j(l)\} \Delta l(l). \quad (5)$$

Here, $l (l = 1, 2, \ldots, L)$ is a variable common to i and j. Also, $\Delta l(l)$ is the length of the route portion from $l-1$ to l, which is taken as $$\Delta l(l) = |i(l) - i(l-1)| + |j(l) - j(l-1)|$$

Equation (5) provides an optimum value based on the nonlinear axial expansion/contraction. The following conditions are set with respect to the time axis distortion function $(i(l), j(l))$ that shows this conversion.

1. Monotonicity: That is, based on the assumption that usually the writer will not change the stroke order of his signature, the distortion function will be a monotone increasing function.

$$j(l-1) \leq i(l), \; j(l-1) \leq j(l)$$

2. Continuity: That is, with respect to continuous stroke-to-stroke coordinate and writing pressure changes, the distortion function has to be a continuous function.

$$|1(l) - i(l-1)| \leq 1, \; |j(l) - j(l-1)| \leq 1$$

3. Boundary conditions: That is, in this embodiment the input pattern starting and end points are fixed, for which the boundary conditions are set as follows.

$$i(1) = j(1) = 1, \; i(L) = j(L) = N$$

Figure 5:
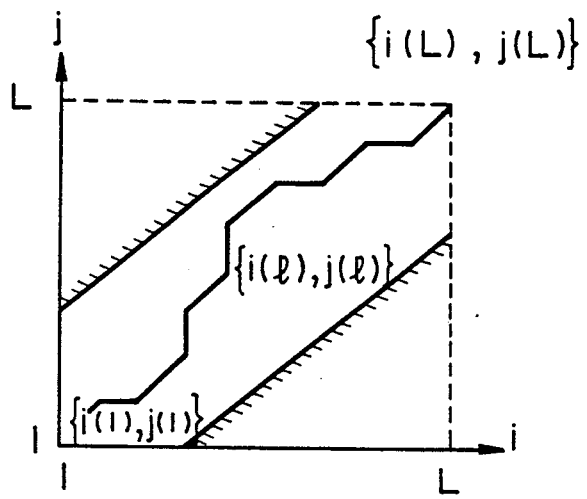
FIG. 5 illustrates an example of distortion function processing according to the present invention.

FIG. 5 shows an example of a distortion function obtained using dynamic programming matching. When two patterns are exactly the same, there will be zero error at each sampling point, in which case the distortion function itself will coincide with line 1, that is, with the diagonal of FIG. 5. However, usually there will be various types of error between patterns, and when these are normalized using dynamic programming matching, as shown in FIG. 5 the distortion function thereof will have an oscillation to each side of the sampling points along the diagonal.

In the case of handwritten characters, as the patterns will coincide to some extent the distortion function will not be far off the diagonal. The hatched portions in FIG. 5 indicate a degree of error that is of an extent whereby it does not come within the scope of the calculations. That is, only the strip between the hatched portions is involved in the calculations. Establishing this window for calculations enables the processing to be simplified.

Thus, the dynamic programming matching enables coordinate and writing pressure series to be given a prescribed weighting and processed simultaneously. Equation (4) shows an example of this; in the case of the present embodiment it can also be shown by the following general equation.

$$d_{(A, B)}^k = w_s |z_A(i) - z_B(j)|^m + w_p |p_A(i) - p_B(j)|^n. \quad (6)$$

Here, error d (degree of difference) power k, coordinate error power m and writing pressure information error power n can each be defined as 1 or any desired value over 1.

Also, weighting coefficient $w_s$ relating to the coordinate series and weighting coefficient $w_p$ relating to the writing pressure series can each be set to an arbitrary numerical value that depends on the coordinate series and writing pressure series.

Experiments show that when the ratio between the weighting coefficients $w_s$ and $w_p$ is about $\sqrt{7}:\sqrt{3}$, the degree of difference can be obtained with a high degree of accuracy.

Figure 6:
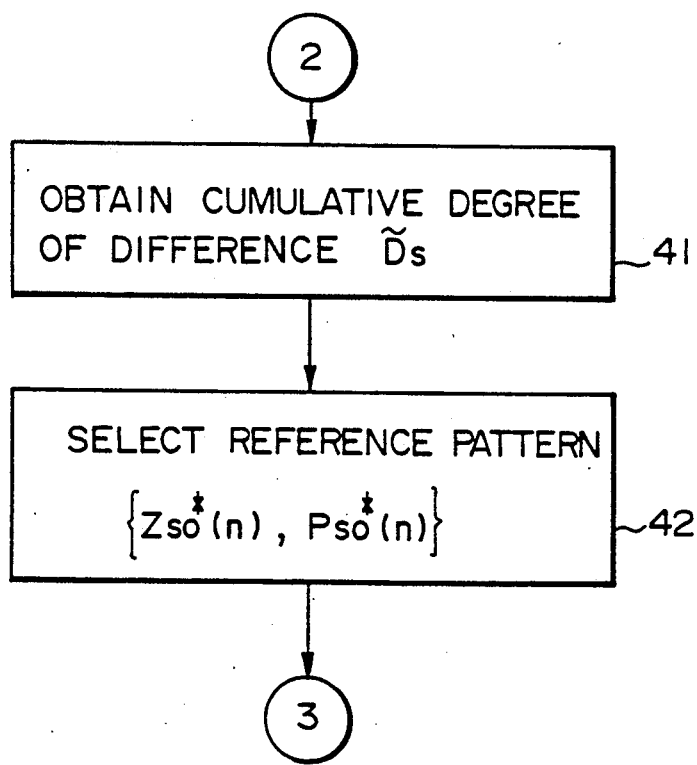
FIG. 6 illustrates the process of selecting a reference pattern.

Using the above, when the degree of difference between the input patterns is obtained by equation (5), the discrepancies between each input pattern and all the other input patterns are accumulated (FIG. 6) and the cumulative degree of difference $D_s$ is obtained, in step 41.

$$\overline{D_s} = \Sigma_{k=1}^{s} D(s,k) \qquad (7)$$

$s = 1, \ldots S.$

Then in step 42 the input pattern with the smallest cumulative degree of difference is selected from among the cumulative degree of difference $D_s(s=1, \ldots, S)$ thus obtained as the reference pattern $\{Z_{s0}(n), P_{s0}(n)\}$. Here, $\{Z_{s0}(n), P_{s0}(n)\}$ is a pattern which attains the minimum $\overline{D_s}$. However, $\overline{D_{s0}} = \min \overline{D_s}$.

The present invention is not limited to the input pattern with the smallest degree of difference being used as the reference pattern. The following shape correction and time correction may be performed, and any desired input pattern selected as the reference pattern. However, selecting the input pattern with the smallest cumulative difference as the reference pattern eliminates the risk that an anomalous pattern included among the input patterns may be chosen as the reference pattern. Also, during the preparation of the registration pattern it is possible to detect and exclude an input pattern detected as having an anomalously large degree of difference relative to the reference pattern.

Selection of the reference pattern is followed by the calculation of the distortion function and shape averaging and time correction of the input patterns. These steps are shown in FIG. 7.

Figure 7:
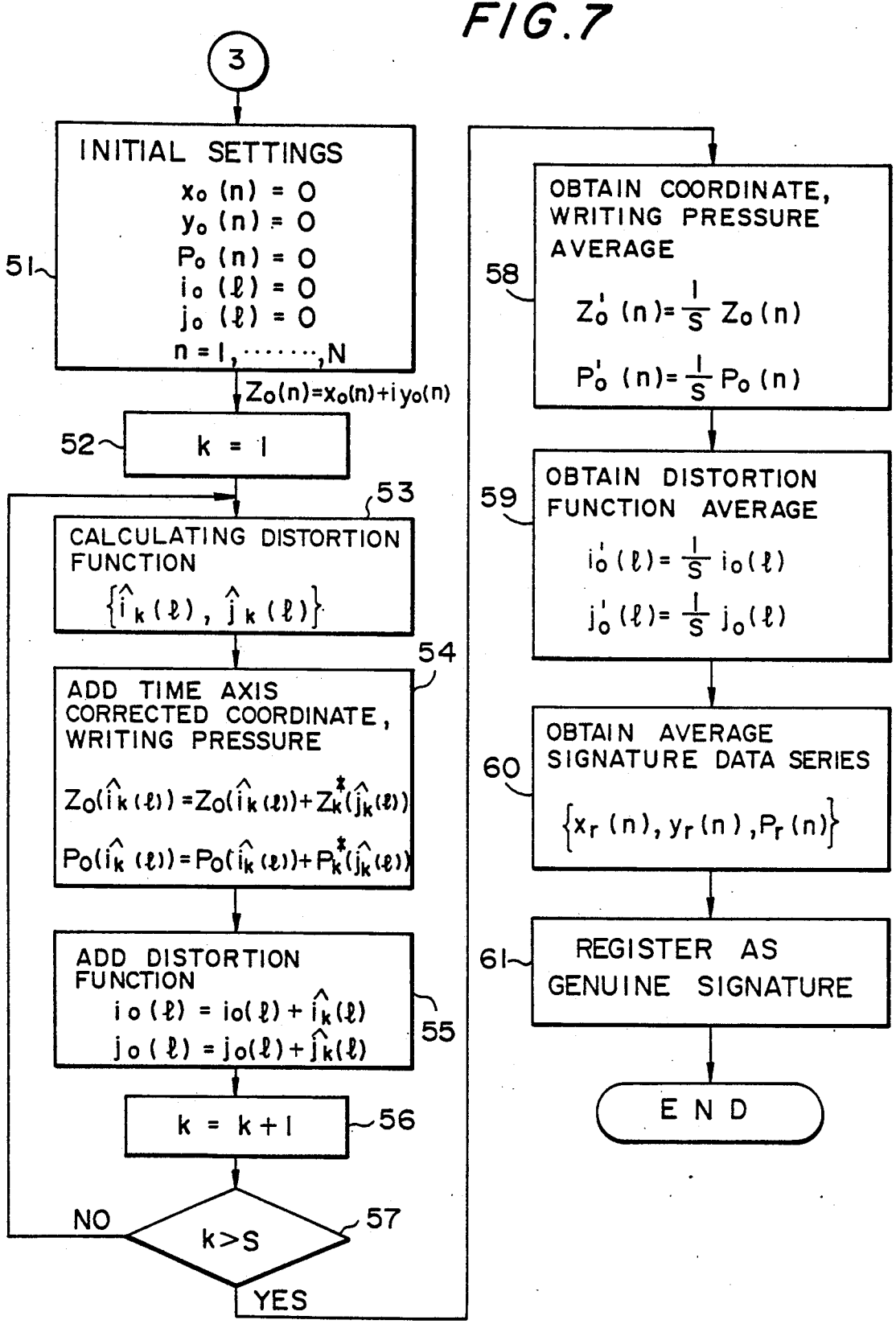
FIG. 7 shows the steps involved in distortion function calculation, shape averaging and time correction.

With reference to FIG. 7, in step 51 the procedure is initialized by setting all initial values to zero. In step 52, each input pattern is assigned a value k iterative calculations of the number of signature inputs, i.e., up to the number of patterns (S), k being incremented as the calculation is iterated until S is reached.

In step 53 the distortion function is calculated using dynamic programming matching, as described below. In step 54 the distortion function is used for time axis correction of each of the input patterns and the corrected coordinate and writing pressure series are added for the ensuing shape averaging.

Step 55 shows the addition procedure for averaging the distortion functions. In step 56, 1 is added to the pattern number k and steps 53 to 56 are repeated until pattern s reaches S, in step 57. In step 58 the shape averaging is obtained by dividing the coordinate and writing pressure series added in step 54 by the number of patterns S.

In step 59 the distortion functions are averaged by dividing the distortion functions added in step 55 by the number of patterns S. In step 60 the shape averaging is time corrected by means of the distortion function average and the pattern thus obtained is registered, in step 61.

Details of the calculations shown in FIG. 7 will now be described with reference to FIG. 8.

Distortion function calculation: In step 53 the distortion function is calculated to obtain the minimum cumulative error between the reference pattern and each of the input patterns. In practice, it is obtained, using dynamic programming matching, as follows.

$$D^2 = (1/2L) \min_{i,j} \sum_{l=1}^{L} d^2\{i(l), j(l)\} \Delta l(l). \qquad (8)$$

FIG. 8 shows the process of extracting coordinate x from the normalized coordinate series. To facilitate the explanation, only two input patterns are shown. The reference pattern $x_{A(i)}$ is shown as a solid line and an arbitrary input pattern 110 is shown by the broken line $x_{B(j)}$. The same starting point and end point are assigned to both patterns by the above normalization: the two patterns differ along the horizontal time axis and the vertical x coordinate axis.

Figure 8A:
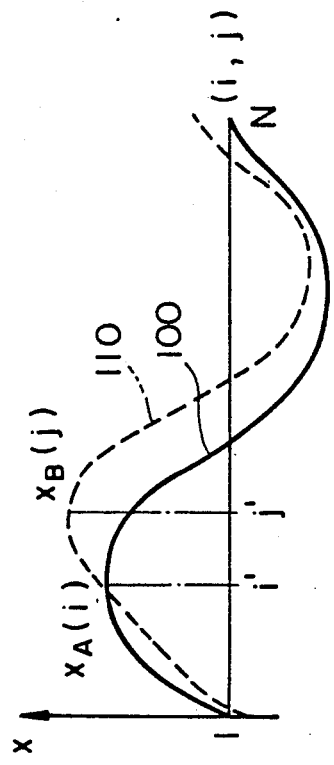
FIGS. 8A to 8F are for explaining the steps shown in FIG. 7.
Figure 8B:
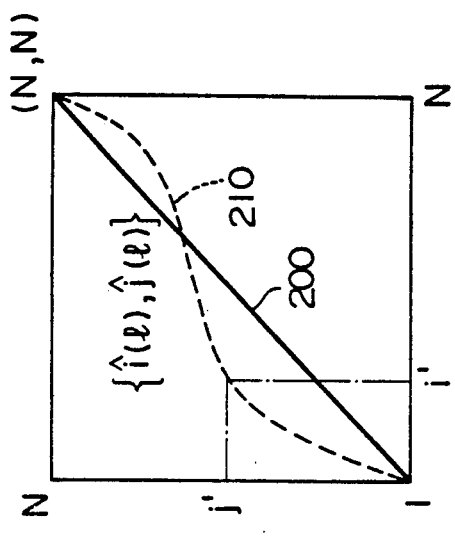

FIG. 8B shows the distortion function of step 53. The solid diagonal line represents distortion function 200 with respect to the same pattern as the reference pattern. The broken line shows distortion function 210 relative to pattern B. As will be clear from the explanation given with reference to FIG. 5, it is shown as a time distortion function above and below the diagonal.

Time axis correction of input patterns: In step 54 normalization is performed using a distortion function whereby the time axis is expanded or contracted to minimize the degree of difference between input patterns and the reference pattern for assigning the reference pattern.

As is apparent from FIGS. 8A and 8B, peak point j' of input pattern $x_{B(j)}$ has to be brought into correspondence with point i' of reference pattern $x_{A(i)}$. That is, by using the distortion function $\{i(l), j(l)\}$ to normalize $x_{B(j)}$, an input pattern is obtained that, as shown by the broken line in FIG. 8C, has the smallest degree of difference. Time axis normalization is performed by fixing the reference pattern (100) on the time axis and stretching-/contracting the time axis of the input pattern (110), i.e. fixing axis i and contracting/expanding axis j.

Figure 8C:
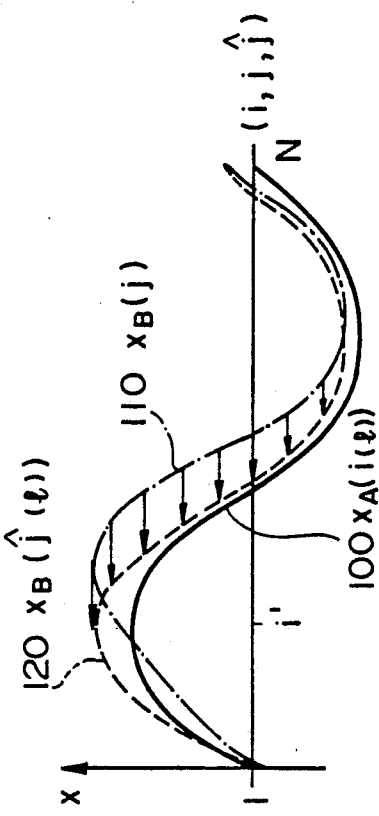

The broken line in FIG. 8C shows how the normalized pattern (120) is brought from the position shown in FIG. 8A to a position of alignment with the reference pattern (100). In FIG. 8C the original input pattern (110) is shown by the chain line. Thus, time axis correction is performed by using the time axis (210) of FIG. 8B to assign each of the sample points.

Shape averaging: Step 54 shows multiple time axis corrected normalized patterns (120) averaged with respect to the x axis. In FIG. 8D this averaging is shown to be that of the reference pattern (100) shown by the solid line and input pattern (120) shown by the chain line, averaged as shown by the broken line (130). Thus, this shape averaging is carried out with respect to all of the multiple input patterns using the addition of step 54 and the division of step 55, with respect to the coordinate series and writing pressure series, as shown by the following equations.

$$Z_0'(n) = (1/S) Z_0(n). \qquad (9)$$

$$Z_0(\hat{i_s}(l)) = \Sigma_{k=1}^{S} Z_k^*(\hat{j_k}(l)). \qquad (10)$$

$$P_0(n) = (1/S)P_0(n). \quad (11)$$

$$P_0(i_s(l)) = \Sigma_{k=1}^S P_k^*(j_k(l)). \quad (12)$$

$$n = 1, \ldots, N$$

$$l = 1, \ldots, L$$

Therefore, this shape averaging is performed in the state in which time axis normalization has been carried out by means of the distortion function, so that distortion along the time axis can be removed and an optimum average achieved with respect to variations in the signature input.

However, if shape averaging is done simply by thus matching the time axis of a fixed reference pattern, the time axis of the average pattern obtained will depend completely on the time characteristics of the reference pattern. Therefore, with respect also to the time axis it is desirable to recorrect to a pattern having the average characteristics of the multiple signature patterns.

As can be seen from FIG. 8C, except for the reference pattern time axis corrected pattern information projected onto the time axis will coincide with the reference pattern because there will be no inclusion of the time axis information of the multiple input patterns.

A feature of the present invention is that distortion function averaging is used for time averaging the shape averaged patterns of FIG. 8D. This is explained below.

Calculation of distortion function average: In step 59, the distortion function added in step 55 are divided by the number of patterns S to obtain the average distortion function. This distortion function average can be thought of as representing time axis variation in the multiple input patterns. The distortion function average is obtained using the following equations.

$$i_0^s(l) = (1/S)\Sigma_{k=1}^S \hat{i}_k(l). \quad (13)$$

If $i_s(l) = 1$, then $i_0^s(l) = 1$.

$$j_0^s(l) = (1/S)\Sigma_{k=1}^S \hat{j}_k(l). \quad (14)$$

Figure 8E:
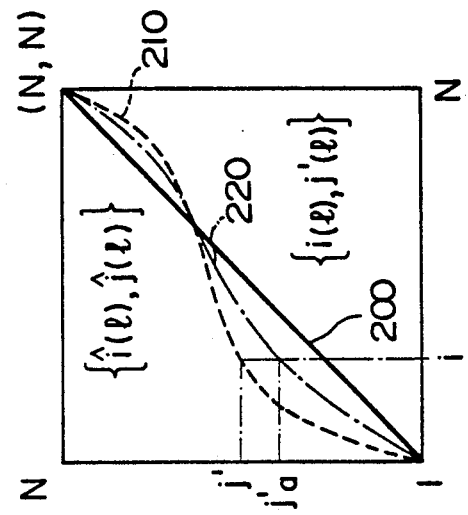
Figure 8D:
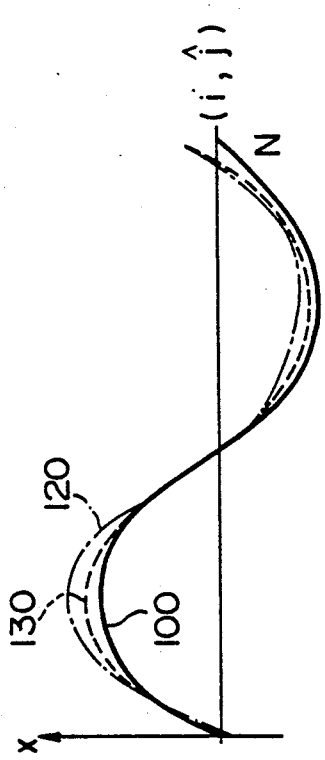

The distortion function averaging is shown in FIG. 8E; the two distortion functions of FIG. 8B are averaged.

Figure 8F:
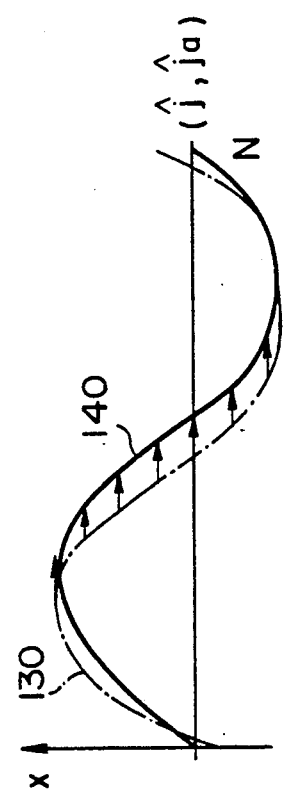

Time correction: The time correction of step 60 is performed by using the distortion function average to correct the time axis of the shape average obtained in step 58. As shown in FIG. 8F, the distortion function average is used to shift the shape averaging chain-line pattern (130) along the time axis to the solid line (140), to thereby obtain the registration pattern. This movement is obtained in the same way as the input pattern time axis correction of step 54, by the simple addition of the pattern shape average and distortion function average.

This time axis correction is performed with respect to the coordinates and the writing pressure. The correction equations are as follows.

$$Z_r(n) = x_r(n) + iY_r(n), i = \sqrt{-1}. \quad (15)$$

$$x_r(n) = (n - j_0'(l)) \cdot x_0'(l) + (j_0'(l+1) - n) \cdot \quad (16)$$

$$x_0'(l+1)/(j_0'(l+1) - j_0'(l)).$$

$$y_r(n) = (n - j_0'(l)) \cdot y_r'(l) + (j_0'(l+1) - n) \cdot \quad (17)$$

$$y_r'(l+1)/(j_0'(l+1) - j_0'(l)).$$

$$p_r(n) = (n - j_0'(l)) \cdot p_r'(l) + (j_0'(l+1) - n) \cdot \quad (18)$$

$$p_r'(l+1)/(j_0'(l+1) - j_0'(l)).$$

Thus, shape correction is used to achieve an appropriate shape with respect to the multiple input patterns and movement variation is averaged by time correction based on a distortion function averaging to provide an enhanced registration pattern embodying the virtual characteristics of the writer, with respect to movement and shape of the signature.

With respect to time axis information, the use of time axis correction when obtaining the shape average of the input patterns enables awkward uniformities in the reference pattern initially chosen to be corrected. Uniformity produced by the above time axis correction is only in the particular multiple signature input patterns. The correction in accordance with the present invention, using the distortion function average, enables the average value of multiple input patterns along a time axis to be obtained.

As has been described in the foregoing, multiple signatures input by a signer are processed to provide an averaged virtual registration pattern that is a pattern with the lowest error among the patterns that are input. The virtual registration pattern is not one actually produced by the signer, but is a pattern registered as a genuine virtual signature by virtue of having the least of the error arising between the signatures written by the same person.

The pattern generation has been shown as being initially registered at the time the signature is written. However, in accordance with the present invention the method can also be used to gradually update the registration pattern in accordance with changes that take place in a signature over time. For this, a prescribed weighting is applied to the current registration pattern and input pattern and an updated pattern is prepared using the same procedure followed for the first registration.

Although the embodiment has been explained with reference to signatures, the method of the invention can be applied to other handwritten input, in which case time axis correction would be used as arc axis correction.

What is claimed is:

1. A pattern generation method in which a time axis is employed for registering a handwritten character with a stroke action, comprising the steps of:
    multiple inputting of handwritten characters in the form of coordinate and writing pressure three dimensional time series information;
    normalizing the position and size of multiple handwritten character patterns thus input;
    calculating a distortion function for selecting a desired pattern from the multiple input patterns as a reference pattern and obtaining a time distortion function between the reference pattern and other input patterns using dynamic programming matching;

using the distortion function for time axis correction of the time axis of each input pattern;

shape averaging the time axis corrected multiple input patterns;

distortion averaging the multiple distortion functions; and time distortion correction of the time axis of the shape averaged patterns, using the distortion function average; whereby the registration pattern is obtained from the distortion function derived shape average and time distortion average.

2. A pattern generation method according to claim 1, wherein the registration pattern is updated in accordance with changes in input patterns corresponding to time-based changes in a handwritten character input pattern, comprising:

forming a multiplicity of handwritten character input patterns from an existing registration pattern and new input patterns; and giving a prescribed weighting to the existing registration pattern and the input patterns and performing each of the steps of the method.

* * * * *